March 4, 1947.  T. BAILEY  2,416,810
FLOUR SIFTER
Filed Feb. 7, 1944  2 Sheets-Sheet 2
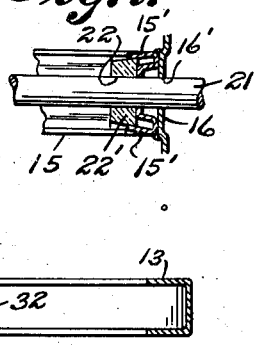
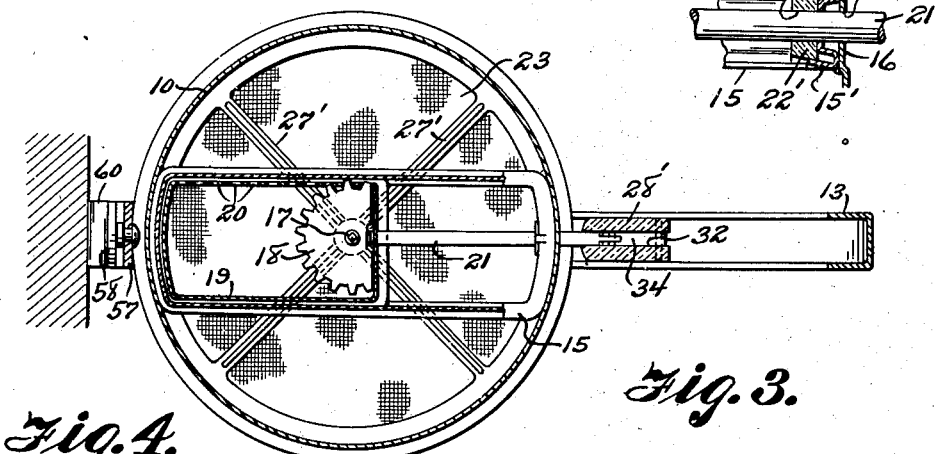
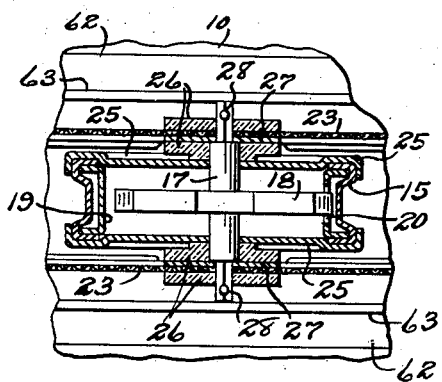
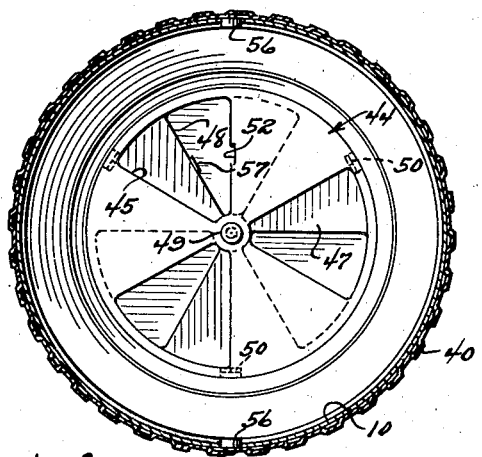
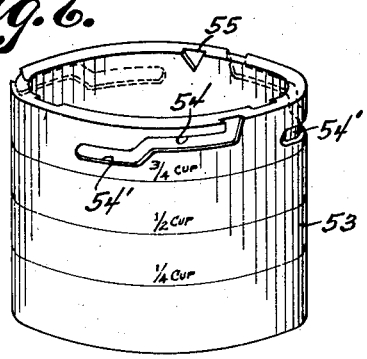
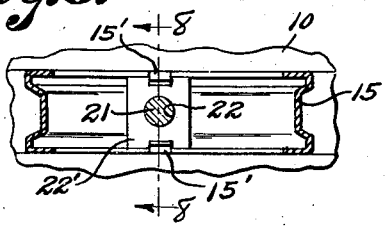
Theodore Bailey
INVENTOR.
BY
Victor J. Evans & Co.
ATTORNEYS Patented Mar. 4, 1947

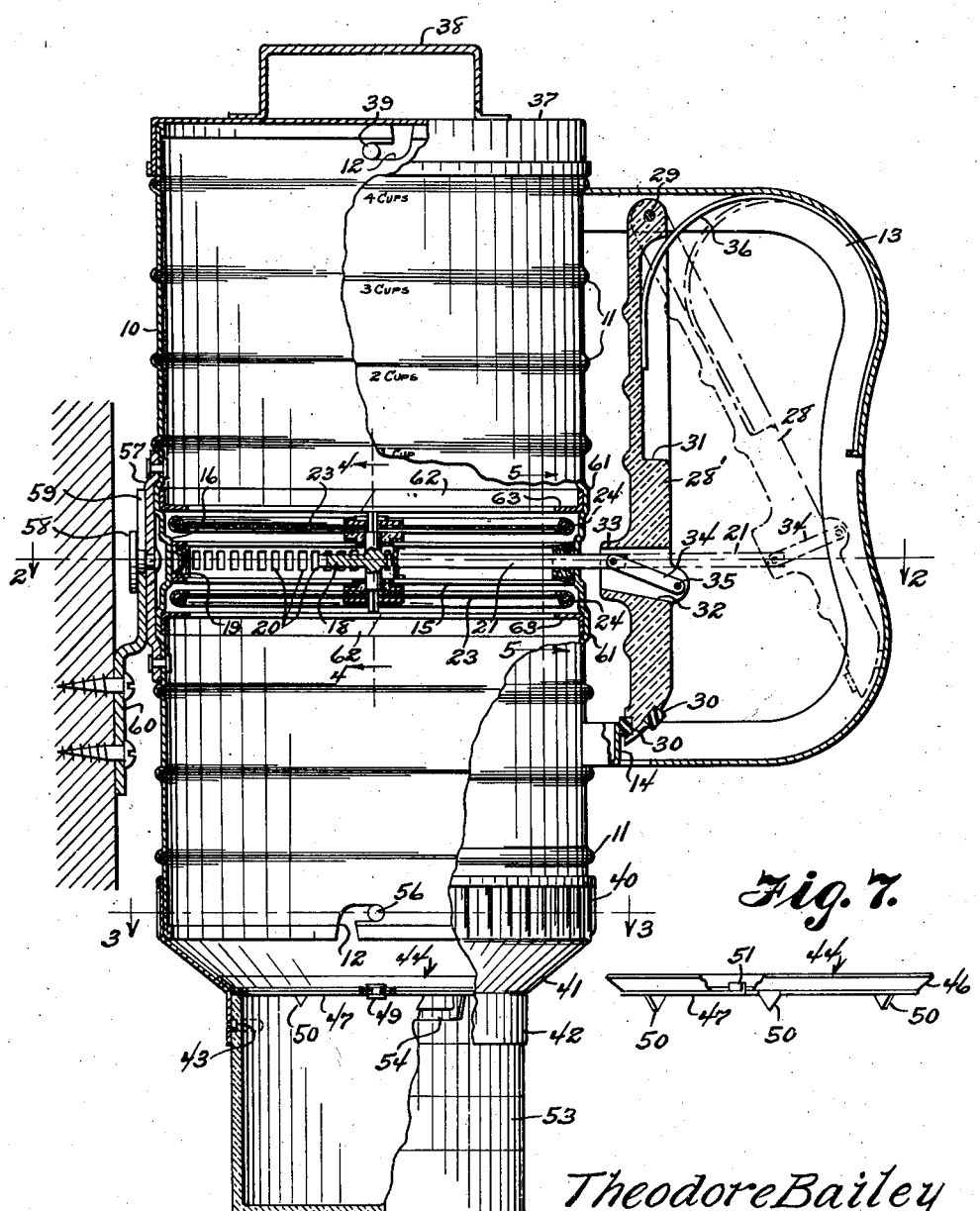

2,416,810

UNITED STATES PATENT OFFICE 2,416,810

FLOUR SIFTER

Theodore Bailey, Habana, Cuba

Application February 7, 1944, Serial No. 521,395

4 Claims. (Cl. 209—357)

The present invention relates to new and useful improvements in flour sifters of the type disclosed in my prior Patent No. 2,204,920, issued June 18, 1940, and has for an object the provision of a flour sifter of generally improved construction.

Another object of the invention is to provide a flour sifter having improved screen oscillating mechanism.

Other objects and advantages of the invention will become apparent as the description progresses.

In the accompanying drawings forming a part of this specification and in which like numerals are employed to designate corresponding parts throughout:

Figure 1 is a view mainly in longitudinal section through the flour sifter and partly in elevation, Figure 2 is a transverse sectional view taken on line 2—2 of Figure 1, Figure 3 is a similar view taken on line 3—3 of Figure 1, Figure 4 is an enlarged detail section taken on line 4—4 of Figure 1, Figure 5 is an enlarged detail section taken on line 5—5 of Figure 1, Figure 6 is a perspective view of a receptacle forming the lower part of the sifter, Figure 7 is an elevational view of the bottom valve disks for closing the discharge opening of the sifter, and Figure 8 is an enlarged detail section taken on line 8—3 of Figure 5.

Referring to the drawings, wherein for the purpose of illustration is shown a preferred example of the invention, 10 designates the body of the sifter in the form of an elongated cylindrical shell of rigid sheet material open at each end and formed with circumferential reinforcing corrugations 11 at longitudinally spaced intervals. At each of its ends the body shell 10 is provided, at diametrically spaced positions, with a pair of angular or bayonet slots 12. To one side of the shell 10 is secured, as by welding, an approximately U-shaped handle 13 disposed longitudinally of the body and advantageously having its intermediate portion bowed inwardly as shown at Figure 1. Adjacent one end the handle 13 has a portion of its web struck inwardly to form a stop 14.

Mounted transversely within the shell 10 intermediate its ends is a guide member 15 in the form of an essentially rectangular elongated loop rounded at the ends in conformity with the circumferential curvature of the shell. This guide member may be formed of a metallic strip of generally channel shaped cross section with its flanges directed inwardly and the intermediate portion of the web inwardly offset as shown to advantage at Figure 5. This guide loop is firmly supported in the shell by attachment, as by soldering or the like, to an annular portion 16 of reduced diameter medially of the ends of the shell, as shown at Figure 1.

Mounted axially in the shell 10 and extending through the guide loop 15 is a shaft 17 having fixed thereon a transversely disposed segmental spur gear 18. This gear is cooperatively related with a slide member 19 in the form of an elongated rectangular loop supported on and disposed to slide longitudinally in the guide member 15. The loop member 19 may be advantageously formed of a continuous length of channel bar having its flanges directed outwardly in sliding engagement between the flanges of the loop 15, as shown at Figure 4, the member 19 having a length slightly exceeding one half the length of the guide loop. One longitudinal side of the slide member 19 is provided with a plurality of longitudinally spaced openings 20 designed to receive the teeth of the spur gear 18 therein and to effect turning of the gear upon slide movement of the slide loop. To one end of the loop 19 is fixedly secured the inner end of a transversely projecting connecting rod 21 mounted to slide through a bore 22 of a bearing 22' and through an opening 16' in the reduced center portion 16 of the shell. The bearing 22' which may be formed of hard plastic or the like, is held in position by struck in portions 15' of the loop 15.

Above and below the loops 15 and 19, in the normal vertical arrangement of the body, are mounted a pair of sifting screens 23, advantageously of fine mesh wire of circular contour and parallel with the loops. These screens are of a diameter slightly smaller than the interior diameter of the shell and have their peripheral margins welded or secured at any suitable manner to annular rigid reinforcing rings 24. As illustrated at Figure 4, a pair of support plates 25 are secured to and extend transversely of the medial portion of the guide loop 15 at the top and bottom thereof to support the shaft 17 which extends through aligned bearing openings therein. Each end portion of the shaft extends through a center aperture in one of the screens 23 and the aligned openings in a pair of hub forming disks 26 fitted against opposite sides of the screen and a hub portion 27 of a spider having radial arms 27' connecting with the ring 24 of each screen mounting. A pin 28 disposed transversely through an aperture at each end portion of the shaft retains the hub assembly in operative association upon the shaft with the lower disk of the upper hub bearing upon the uppermost support plate 25. Thus, the screens are fixed to the shaft for oscillation therewith.

Supported in a generally longitudinally extending position on the handle 13 is an operating lever 28 having one end connected for swinging movement in the handle by a pivot 29 and having inserts 30 of resilient cushioning material in the opposite free end. This lever, which may be advantageously formed of plastic material, is provided with a longitudinal groove 31 in its outer side in that portion adjacent the pivoted end and has a tapered slot 32 transversely therethrough and through a boss 33 at its inner side. Within the slot 32 is mounted a link bar 34 having one end connected by a pivot 35 to the outer portion of the lever and its opposite inner end pivotally connected to the outer end of the connecting rod 21. This provides a flexible connection enabling pivotal movement of the lever to effect rectilinear reciprocating movement of the connecting rod. A strip 36 of spring metal is mounted in inverted U-shaped position within the handle with one end portion bearing against the inwardly bowed outer part of the handle and its opposite end portion fitted in the groove 31 and bearing against the lever to yieldingly force the latter inwardly toward the body. At the opposite end the inserts or cushioning pads 30 on inner and outer parts of the lever are disposed to make contact with the stop 14 in the inward position of the lever and with the handle respectively in the outermost position thereof.

On the uppermost end of the body shell 10 is normally fitted a flanged cover cap 37 having a U-shaped handle 38 secured thereon and provided with inwardly projecting pins 39 engageable with the bayonet slots 12 for removably securing the cover on the body.

At the lower end of the body is attached a reducer fitting of funnel shaped configuration having a cylindrical flange 40 slidably fitted over the lower end of the shell and which may have transverse corrugations for convenient turning. A frusto-conical portion 41 depends from the flange 40 and joins a cylindrical bottom flange 42 of reduced diameter at its lower end, the latter flange having a plurality of, in the present instance three, inwardly projecting studs 43. At the lower portion of the frusto-conical part 41 of the fitting is mounted a transversely disposed disk 44 provided with three sector shaped discharge openings 45 and having a flared peripheral rim 46 soldered or otherwise fixed in the fitting. In face to face relation with the disk 44 is mounted a companion disk 47 of approximately corresponding diameter and disposed immediately below the disk 44. The lower disk 47 is provided with three sector shaped openings 48 approximately corresponding to and registrable with the openings 45 in the upper disk, a headed pivot 49 being extended through center apertures in the disks to oscillatingly support the lower disk with relation to the upper fixed disk. At circumferentially spaced intervals the bottom disk 47 is formed with a plurality of downwardly pointed depending tongues 50 at its peripheral portion while, at the edge of one of its openings 48 it is formed with an upstanding lug 51 engageable with a notch 52 in one radial edge of the upper disk so as to limit the turning movement of the bottom disks to an angular movement corresponding to the angular dimension of its openings.

Detachably engageable with the flange 42 in register with the disk controlled bottom discharge openings of the body is a cylindrical cup-shaped receptacle 53 which may advantageously be formed of transparent plastic having its bottom end closed and its top end open. In the upper exterior portion the receptacle is provided with three uniformly spaced L-shaped bayonet slot sections 54 opening through the top edge of the receptacle for engagement with the pins 43, each of which is in continuation with an offset, i. e., lower, bayonet slot section 54', the same having the adjacent ends of their circumferential portions communicating with one another. Interiorly of the top edge portion of the receptacle are provided three spaced triangular shaped recesses 55 designed to slidably receive therein the tongues 50 of the bottom disk 47. Thus, as the receptacle is slidably fitted within the flange 42, the vertical and circumferential portions of the upper bayonet slot sections 54 receive the pins 43, prior to the engagement of the tongues 50 in the recesses 55, so that the receptacle is supported in position on the flange 42, without disturbing the valve disk 47. Upon turning the receptacle in a counterclockwise direction, as viewed at Figures 1 and 6, the pins 43 will pass from the circumferential portions of the upper bayonet slot sections 43 and downwardly into the similar portions of the offset or lower bayonet slot sections 54', when, upon continued turning of the receptacle, the bottom disk is caused to turn and bring its openings 48 into registration with the openings 45 in the upper disk providing valvular means for opening the receptacle to the body for the reception of flour into the former. As the receptacle is turned to open the discharge controlling disk the pins 43 fully engage the circumferential portions of the bayonet slot sections 54' to support the receptacle in filling position. As shown at Figure 6, the receptacle may be marked by circular lines to designate one-quarter, one-half or three-quarters of a cup of flour.

As shown at Figure 1, the flange 40 of the reducing fitting attached to the bottom of the body may be equipped with a pair of inwardly projecting studs 56 for engagement with bayonet slots 12 in the bottom end portion of the body shell for removably securing the fitting in position.

To that side of the body opposite the handle connection is secured a longitudinally extending rigid strip 57 having fixed to its medial portion an outwardly projecting headed gudgeon 58 adapted to slidably engage the vertical slot 59 of an offset bracket 60 adapted to be secured in vertical arrangement to a supporting wall or panel. This provides a readily releasable mounting for the body and enables turning thereof to reverse its position when desired.

Above and below the struck in lips 16 the body 10 is formed with a pair of circumferential relatively wide corrugations 61 each of which provides an interior channel in which is seated a split ring 62 sprung therein. Each of the rings 62 is formed with an inwardly directed flange 63 disposed adjacent to and positioned to cover the peripheral ring portion of the screens so as to prevent the flour dropping between the screens and the shell wall.

The flour placed in the body shell by removal of the cover cap 37 is subjected to sifting action by manual operation of the lever 28, the hand of the operator gripping the handle and the lever and pulling the lever outwardly against the outer portion of the handle by movement of the fingers. The lever is returned to its inward position, as shown in full lines at Figure 1, by the action of the spring 36 with the inward bumper pad 30 contacting the stop element 14. Such oscillating movement of the lever effects back and forth reciprocation of the slide member 19 on the guide loop 15 with the result that the apertured rack forming side portions of the slide maintaining engagement with the gear 18, oscillates the latter together with the upper and lower screens 23 fixed to the gear shaft through an angular movement of approximately 180 degrees. The sifted flour dropping through the screens is collected in desired quantity in the suspended receptacle 53 which, upon being turned in a clockwise direction to cause the pins 43 to pass from the offset or lower bayonet slot sections 54' back into the upper bayonet slot sections 54, effects closing of the discharge openings and enables detachment of the receptacle.

As will be noted from Figure 1, the corrugations 11, especially those between the sifting screens and the top end, are spaced axially of the shell at intervals corresponding to cupfuls of flour and may be advantageously marked successively so as to indicate the quantity of flour therein in terms of cupfuls.

It will also be observed that when the receptacle 53 is removed from the bottom end of the shell the bottom forming valve disks are, by the nature of their construction and association with the receptacle, as described in the foregoing, disposed to close the discharge openings to tightly close the bottom of the sifter body. It is also contemplated to produce a less expensive form of the device without the measuring cup and its means of attachment to the bottom end of the shell.

Another advantageous feature of the device is that the construction is such that it may be conveniently turned to reversed positions, as many times as need be to effect proper sifting of its contents, without necessitating the removal thereof.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a sifter having a hollow body, an elongated guide loop mounted transversely in the body, supporting plates on the body, a rotatably supported shaft extending through and supported by the plates, a pair of screens fixed to opposed ends of the shaft outwardly of and parallel with the guide loop, a segmental gear fixed to the intermediate portion of the shaft, and a looped slide member mounted to reciprocate on the guide loop having a longitudinal portion providing a rack engaging the teeth of the gear for oscillation of the gear and screens upon reciprocation of the slide.

2. In a sifter having a hollow body, an elongated guide member mounted transversely in the body, supporting plates on the body, a rotatably supported shaft extending through and supported by the plates, a pair of screens fixed to opposed ends of the shaft outwardly of and parallel with the guide member, a segmental gear fixed to the intermediate portion of the shaft, a slide member mounted to reciprocate on the guide member having a longitudinal portion providing a rack engaging the teeth of the gear for oscillation of the gear and screens upon reciprocation of the slide, a pivoted handle mounted exteriorly of the body having operating connection with the reciprocatory slide, said lever being manually operable to move the slide in one direction, and spring means engaging the lever to resiliently move the slide in the opposite direction.

3. A sifter device, comprising a supporting shell having a wall provided with formations on which the sifter device is mounted, a channeled guide member having parallel side bars and fixed at its ends to the shell, a slide member mounted in the guide member and having side bars slidably supported in the channels of the guide member, said slide having uniformly spaced openings in one side bar, a shaft, a gear on the shaft disposed to engage its teeth in the openings in the side bar of the slide, sifter screen means arranged in proximity with the guide member, hub devices on the screen means, the shaft journaled in the hubs, supports for the shaft, a pivoted operating lever, a spring normally holding the operating lever in a passive position, and connections including a rod between the operating lever and the slide whereby to move the slide in the guide loop to rotate the gear and shaft and the screen means on the shaft.

4. A sifter device comprising a supporting shell having a wall provided with formations on which the sifter device is mounted, an elongated channeled guide member having parallel side bars and fixed at its ends to the shell, an elongated slide member having parallel side bars engaged in the channeled side bars of the guide loop to slide therein, the slide having uniformly spaced openings in one side bar, a shaft, means for supporting the shaft, a gear on the shaft disposed to engage its teeth in the openings in the side bar of the slide, a pair of screens arranged above and below the guide loop, hub forming devices on each of the respective screens in which the shaft is journaled, a lever pivoted at one end, a spring engaging the lever to hold it in a normally passive position, and connections including a rod between the operating lever and slide whereby to move the slide in the guide loop to rotate the gear and shaft and the screens on the shaft.

THEODORE BAILEY.

REFERENCES CITED

The following references are of record in the file of this patent:

UNITED STATES PATENTS

| Number | Name | Date |
| --- | --- | --- |
| 2,204,920 | Bailey | June 18, 1940 |
| 1,822,557 | Beatton | Sept. 8, 1931 |
| 1,002,343 | Wantling | Sept. 5, 1911 |
| 1,798,108 | Randolph | Mar. 24, 1931 |
| 1,290,531 | Evert | Jan. 7, 1919 |